From the above references, there is no disclosure of an alternate disposed fork-like arrangement of bars, as required by Claims 21 et seq. of the instant application. Therefore, the rejection of Claims 21 et seq. under 35 USC 102 is overcome by this amendment.

United States Patent [19]
Rhinehart

[11] 3,777,710
[45] Dec. 11, 1973

[54] AUTOMATED SYSTEMS FOR RAISING AND TRANSPORTING BROILERS

[75] Inventor: Vance Rhinehart, Apison, Tenn.

[73] Assignee: Cumberland Corporation, Chattanooga, Tenn.

[22] Filed: Feb. 2, 1972

[21] Appl. No.: 222,805

[52] U.S. Cl. .................... 119/17, 119/18, 119/19
[51] Int. Cl. ............................................ A01k 31/18
[58] Field of Search .................... 119/17, 18, 19; 220/8, 19

[56] References Cited
UNITED STATES PATENTS

| | | | |
|---|---|---|---|
| 2,026,417 | 12/1935 | Conway et al. | 119/19 |
| 1,632,033 | 6/1927 | Miller | 119/19 |
| 3,381,664 | 5/1968 | Barlocci | 119/17 |
| 1,664,308 | 3/1928 | Miller | 119/19 UX |
| 2,123,289 | 7/1938 | Olson | 119/19 X |

*Primary Examiner*—Hugh R. Chamblee
*Attorney*—John W. Malley et al.

[57] ABSTRACT

A coop and method for raising and transporting fowl wherein the fowl are raised in a coop with a first portion having an open top and a second portion closing that top while adding height to the coop and volume to the coop interior. For transportation, the second portions are removed to reduce the height of the coop to that suitable for transportation, but unsuitable for growing, and the first portions stacked so that the bottom of each first portion closes the top of the first portion below it with the top first portion in each stack being otherwise covered if necessary. Food and water can be provided within the cage or by access to conventional feeding and watering systems through the vertical bars of the first portion. For exterior feeding systems the first portion preferably includes two telescoping members movable vertically with respect to each other and both having vertical bars with bars of one member disposed alternately with bars of the other member so that the members can be moved with respect to each other from a first position in which the adjacent bars have a first separation large enough for chicks to extend their heads between them for feeding and an inner volume sufficient for such young chicks to a second position in which adjacent bars in at least a portion of the coop have a greater separation large enough for fowl grown larger to extend their heads between them for feeding and an inner volume sufficient for such larger fowl.

21 Claims, 7 Drawing Figures

PATENTED DEC 11 1973 3,777,710
SHEET 2 OF 4
Fig. 2.
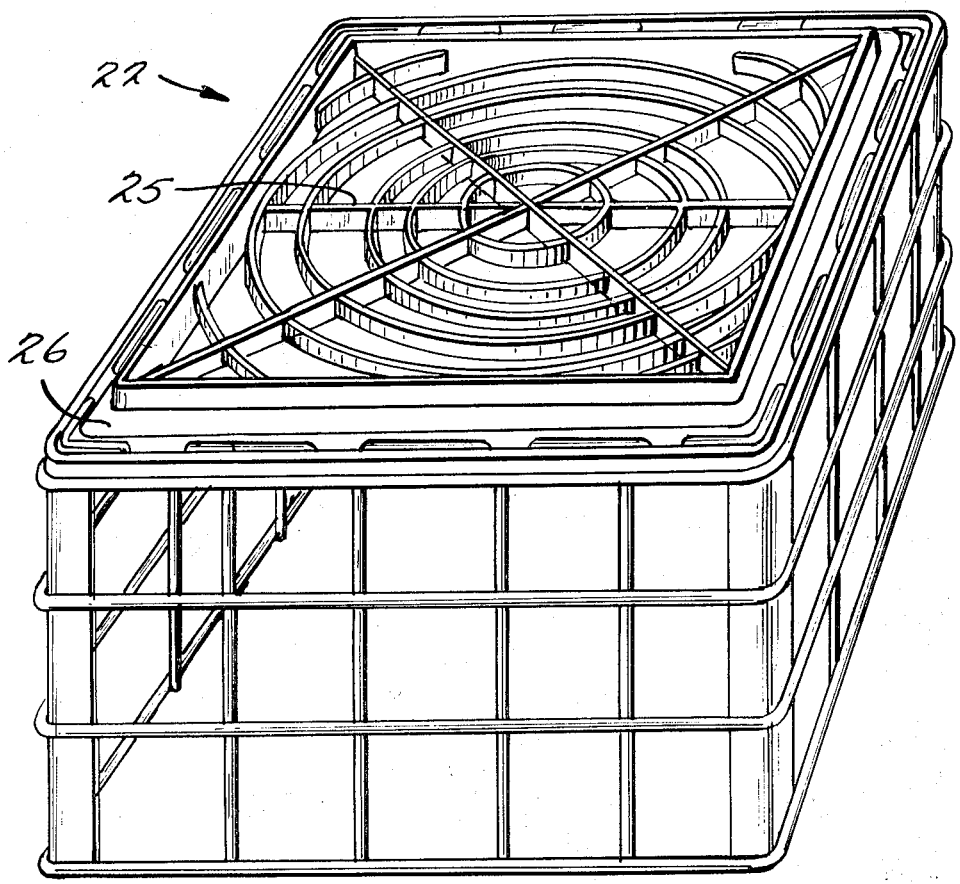
Fig. 5.
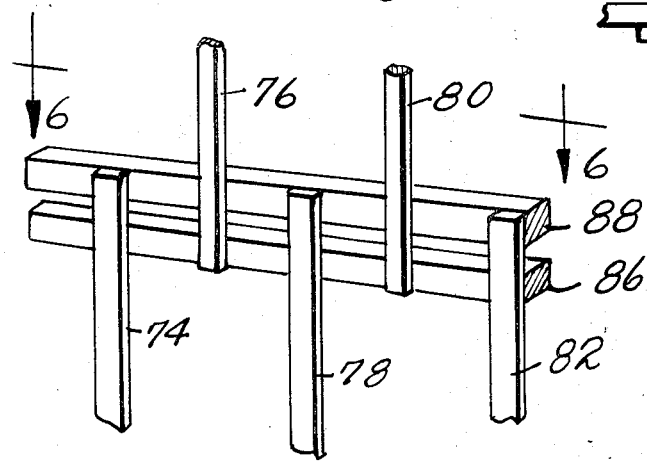
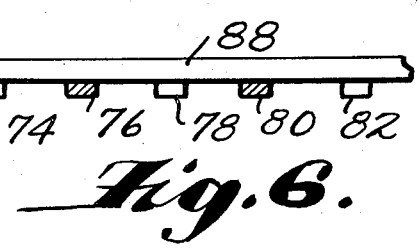
Fig. 6.

AUTOMATED SYSTEMS FOR RAISING AND TRANSPORTING BROILERS

BRIEF DESCRIPTION OF THE PRIOR ART AND SUMMARY OF THE INVENTION

The invention relates to a poultry coop and to a method of raising and transporting poultry.

Because of the trend toward automation in poultry production, the critical shortage of labor at a resonable cost, sanitation problems and other factors, the tendency in recent years has been toward total rearing of poultry in cages. While difficulties such as cannibalism, poor feathering and breast blisters have in the past thwarted attempts to raise broilers, in particular, in cages, many of these difficulties have now been resolved. The perplexing problem of breast blisters, in particular, has been extensively reduced, if not eliminated, by the use of plastic floors for the coops instead of wire floors. In this regard, reference is made to a article by Ray Lloyd in BROILER INDUSTRY, April 1970, pages 55–57.

One of the drawbacks in approaches now used for growing broilers and other poultry in cages is that the poultry must be manually handled several times during growth, a time consuming and expensive operation. Usually the chicks are grown in smaller cages and then transferred before completely grown to other cages where they grow to the size desired for processing. When the birds are ready to be processed, they are removed from the coops in which they have grown to full size and are placed in transporting coops which are frequently made of plastic and are provided with a lid on the top for placing and removing the birds. While a coop of at least 14 inches in height is required for complete grow-out of broilers, only about 9 inches of height is required for transporting the birds. In general less room is required for transporting than rearing any poultry. Hence, transporting poultry in the coops in which they are now raised would not be efficient even if it were practical. At the processing plant, the birds are manually removed by opening the door on the top of the transporting coop and reaching in to grab the feet of each of the birds in the coop in turn.

The present invention relates to a coop and a method and system for raising and transporting poultry, such as broilers, wherein the coop in which the broilers are raised is comprised of two portions. A first portion includes a floor, which is preferably made of plastic with a plurality of apertures therein, and sides extending upward from the floor to an open top. The second portion of the coop closes the top and preferably also includes further sides for extending the height of the coop and the interior volume of the coop to a height and volume suitable for raising the chicks to full growth. The second portion is removably attached by any suitable means to the first portion for closing the top of the coop and preventing escape of the birds. For transporting the poultry to market, the first portions can be simply removed to reduce the height of the coop to a height suitable for transporting but too short for grow-out. The first open topped portions of the coops with poultry can then be stacked one on top of the other on a truck or the like so that at the bottom of each of the first portions of the coop closes the top of the first portion below it with the top first portion in each stack being closed by a second portion or any other suitable cover. Poultry can thus be raised and transported efficiently in the same coop without unnecessary manual handling.

While the poultry are being raised, the coops are preferably arranged in a suitable building with food and water provided, for example, by a conventional feed mechanism which runs through the first or second portions of each coop and delivers food and water to the birds in each coop. Alternatively, a conventional exterior feeding system of the type comprising a trough having a chain mechanism moving through the trough for conveying feed along the trough can be employed. The coops are hung or disposed adjacent the feeding trough so that the birds can extend their heads between the vertical bars which extend upward to form in part a side of the first portion.

One of the problems in the past in raising poultry from small chicks to their full size in a single coop is that a separation between adjacent vertical bars which will permit small chicks to extend their heads between adjacent bars and yet not escape from the coop into the feeding trough is not sufficient for a full grown bird to extend its head through the same space. In the past guards have been provided between the feeding trough and the cage front to prevent the escape of chicks, and such arrangements are described, for example, in the patents to Voran, U.S. Pat. No. 3,490,418 and Maxfield, U.S. Pat. No. 3,478,721.

According to a further aspect of the invention of this application this problem is resolved by providing as the first portion two telescoping members which are movable vertically with respect to each other and which both have vertical bars with the bars of one member disposed alternatively with bars of the other member so that the members can be moved with respect to each other from a first position in which adjacent bars have a first separation which is large enough for the chicks to extend their heads between adjacent bars for feeding, and an inner volume sufficient for such young birds to satisfactorily grow, and a second position in which adjacent bars in at least a portion of the coop have a greater separation which is large enough for grown birds to extend their heads between adjacent bars for feeding and an inner volume sufficient for such larger fowl. Thus, the inner volume of the cage and the separation between vertical bars can be changed from a first position suitable for small chicks to a second position suitable for larger birds so that the chicks need not be transferred to another coop; instead the coop itself is quickly and simply adjusted.

Many other objects and purposes of the invention will become clear from the following detailed description of the drawings.

BRIEF DESCRIPTION OF THE DRAWINGS

FIG. 2 shows a bottom perspective view of the lower portion of the coop of FIG. 1.

FIG. 5 shows a perspective view of a portion of the two telescoping members of one of the coops of FIG. 4.

FIG. 6 shows a cut-away view of FIG. 5 along the lines 6—6.

DETAILED DESCRIPTION OF THE DRAWINGS

Figure 1:
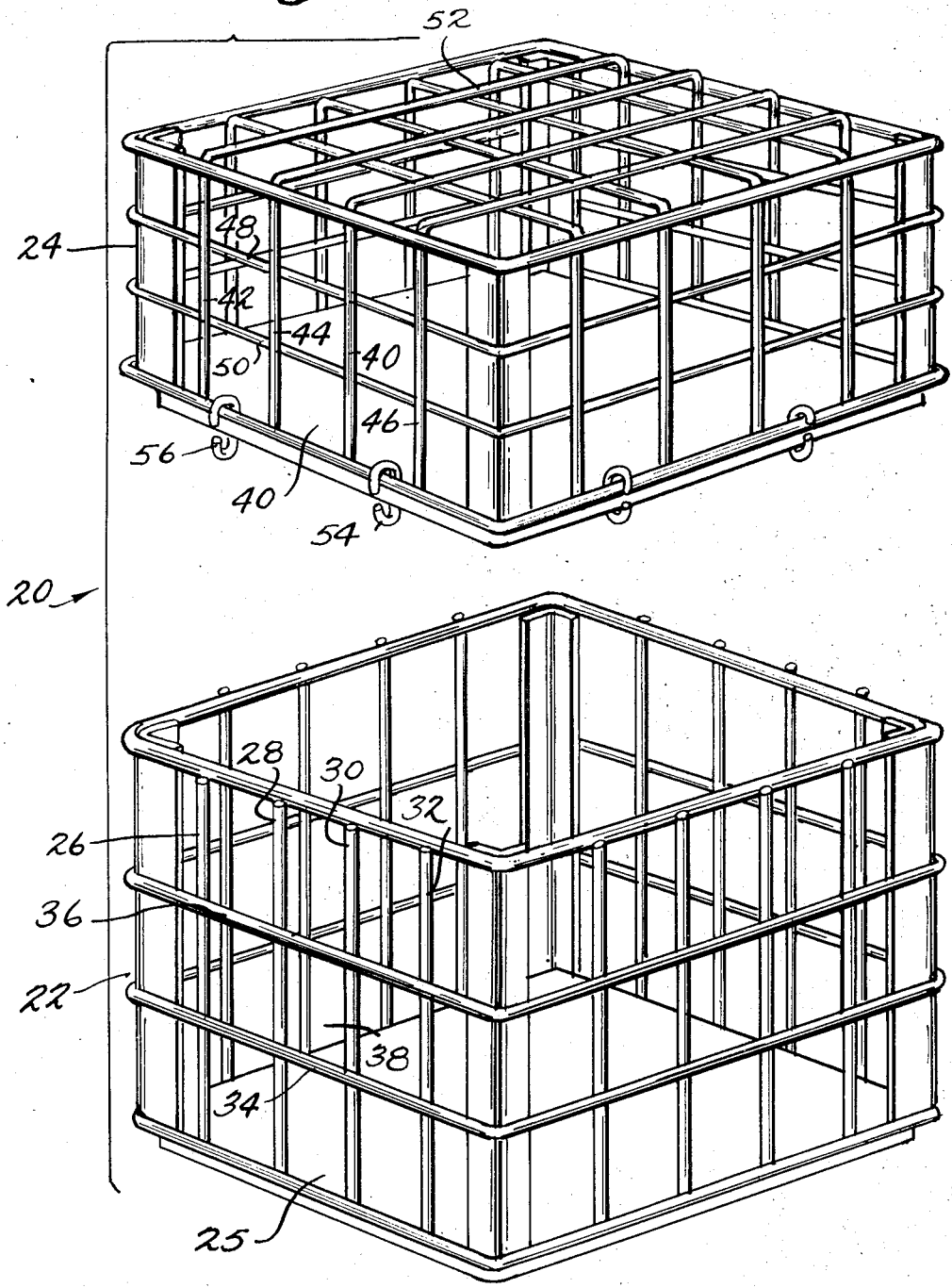
FIG. 1 shows a perspective view of a coop according to one aspect of the invention with the top portion shown removed.

Reference is now made to FIG. 1 which shows a coop 20 comprised of a first lower portion 22 and a second upper portion 24. As can be seen, portion 22 includes a floor 25 and four sides defined by a plurality of vertical and horizontal bars. For example, bars 26, 28, 30 and 32 together with horizontal bars 34 and 36 define one of the four sides 38 of portion 22, and the remainder of the sides are preferably similar to side 38. If the poultry to be raised in coop 20 are to be fed by means of a trough or other mechanism which moves feed exterior to the coop so that the birds must extend their heads between vertical bars such as 26 and 28 to feed, then the separation between adjacent bars must be sufficient to permit such extension and at the same time prevent escape of the birds. If the chickens are to be fed by a mechanism which extends within coop 20, for example of the type depicted in FIG. 3, then the separation between vertical and horizontal bars need only be sufficient to prevent escape of the chickens at their smallest size in coop 20 and at the same time provide adequate ventilation, etc.

The top portion 24 of coop 20 is similarly comprised of a plurality of vertical and horizontal bars. For example, side 40 is a side of portion 24, and, when portion 24 is attached to portion 22, is the extension of side 38. Side 40 is comprised of vertical bars 42, 44, 40 and 46 as well as horizontal bars 48 and 50. Portion 24 also includes a top 52 which may be of any suitable construction and in this embodiment is comprised of a plurality of transversely extending bars, which prevent the chickens from escaping from coop 20. Portion 24 can be attached to portion 22 by any suitable means, and in this arrangement a plurality of clips such as clips 54 and 56 are provided for connecting the two portions together during the time that the poultry are being raised in coop 20. Coop 20 is intended to conventionally contain a number of individual birds which are raised together.

As mentioned briefly above, poultry normally require a greater coop volume and height during grow-out than is required during transportation. In the case of broiler chickens, at least 14 inches height is required during grow-out, while only 9 inches height and correspondingly less volume is needed during transportation. The additional volume provided by portion 24 when added to the volume of portion 22 is sufficient for chickens during grow-out. However, when the chickens have reached the desired size and are ready for processing, the top portion 24 can be removed from the bottom portion 20, and the chickens in bottom portion 20 then moved by any suitable means to a location where they can be stacked one on top of another and loaded into a truck or the like for transportation to the market. The birds in portion 22 need never be individually handled during this process.

As can be seen in FIG. 2, the floor 25 is preferably a plastic floor having a plurality of apertures in any suitable pattern and attached to the vertical bars, such as bars 26, 28, 30 and 32 which comprise the sides of portion 22. The use of plastic as mentioned above has been found to be instrumental in reducing breast blisters and is preferred. Floor 25 further has on its underlying side an extension 26 extending around the periphery of floor 25 which fits into the open top of another portion 22 of another coop so that the portions 22 can be stacked easily and quickly one atop the other with the floor of each portion 22 closing the top of the portion below it. Any suitable cover can be employed if necessary for closing the portion on the top of the stack or the portions can be fitted into a vehicle such that there is insufficient room between the vehicle roof and the top of the portion atop the stack for any birds to escape.

Figure 3:
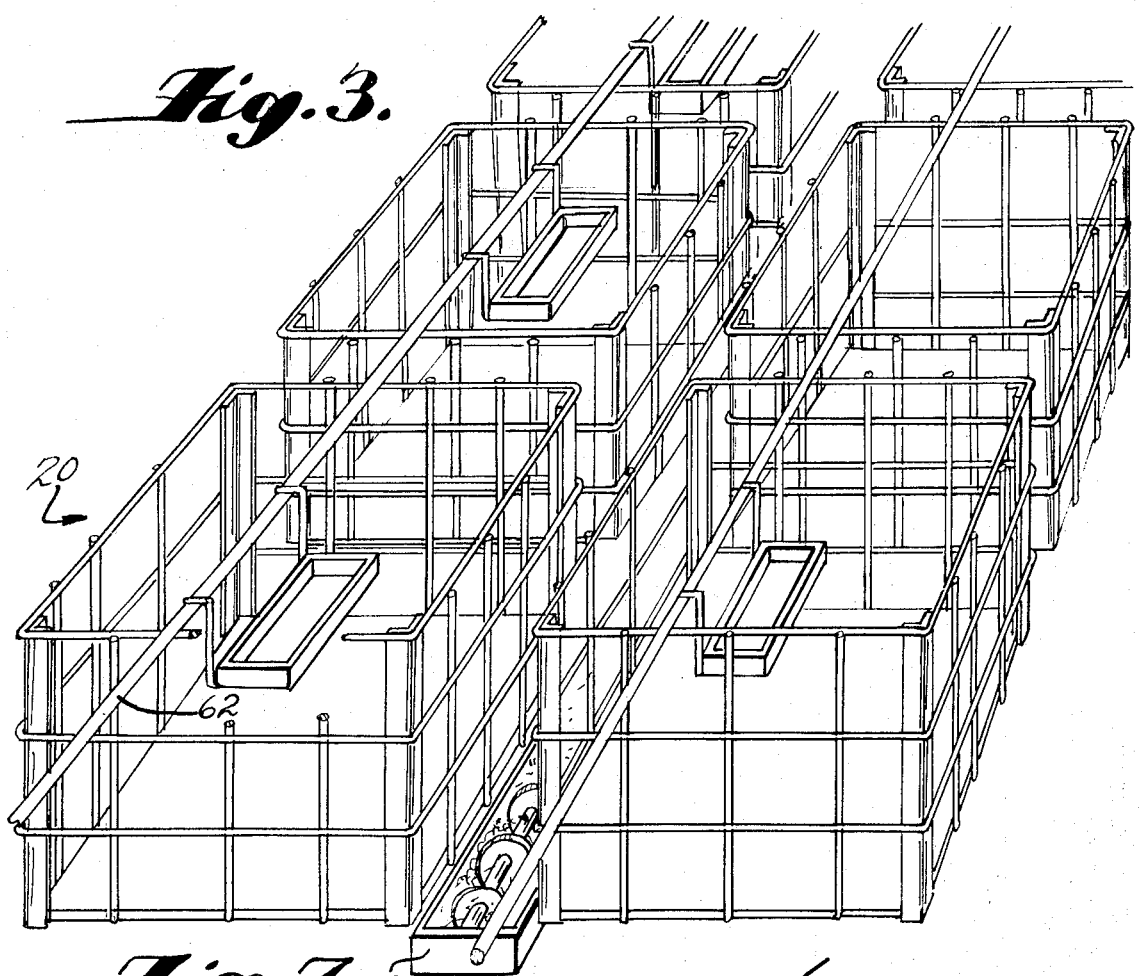
FIG. 3 shows a perspective view of a number of coops, such as shown in FIG. 1, arranged in a flat deck type configuration.

Reference is now made to FIG. 3 which shows a plurality of coops 20 grouped in the conventional flat deck type configuration with their tops removed for clarity in illustration and with a portion of one of the coops cut-away for illustrating the feeding system. In this arrangement, feed for the chickens in each coop is provided via a line 60 which terminates in each coop in a feeding mechanism from which the birds can be fed. An auger system or any alternative arrangement can be employed for moving the feed along this line. Similarly a line 62 provides water for each of the cages. In this fashion, a single, simple feeding arrangement can be employed to provide food and water to a number of different coops automatically and efficiently. If desired, the feeding mechanisms can pass through the portions 24 so that, to remove the birds from the house for transportation it is only necessary to lift portions 24 and the associated food and water mechanism above the portions 22 and then to move the portions 22 by any suitable fashion to the locations where they are stacked and placed in a vehicle for transportation to the processing facility.

Figure 4:
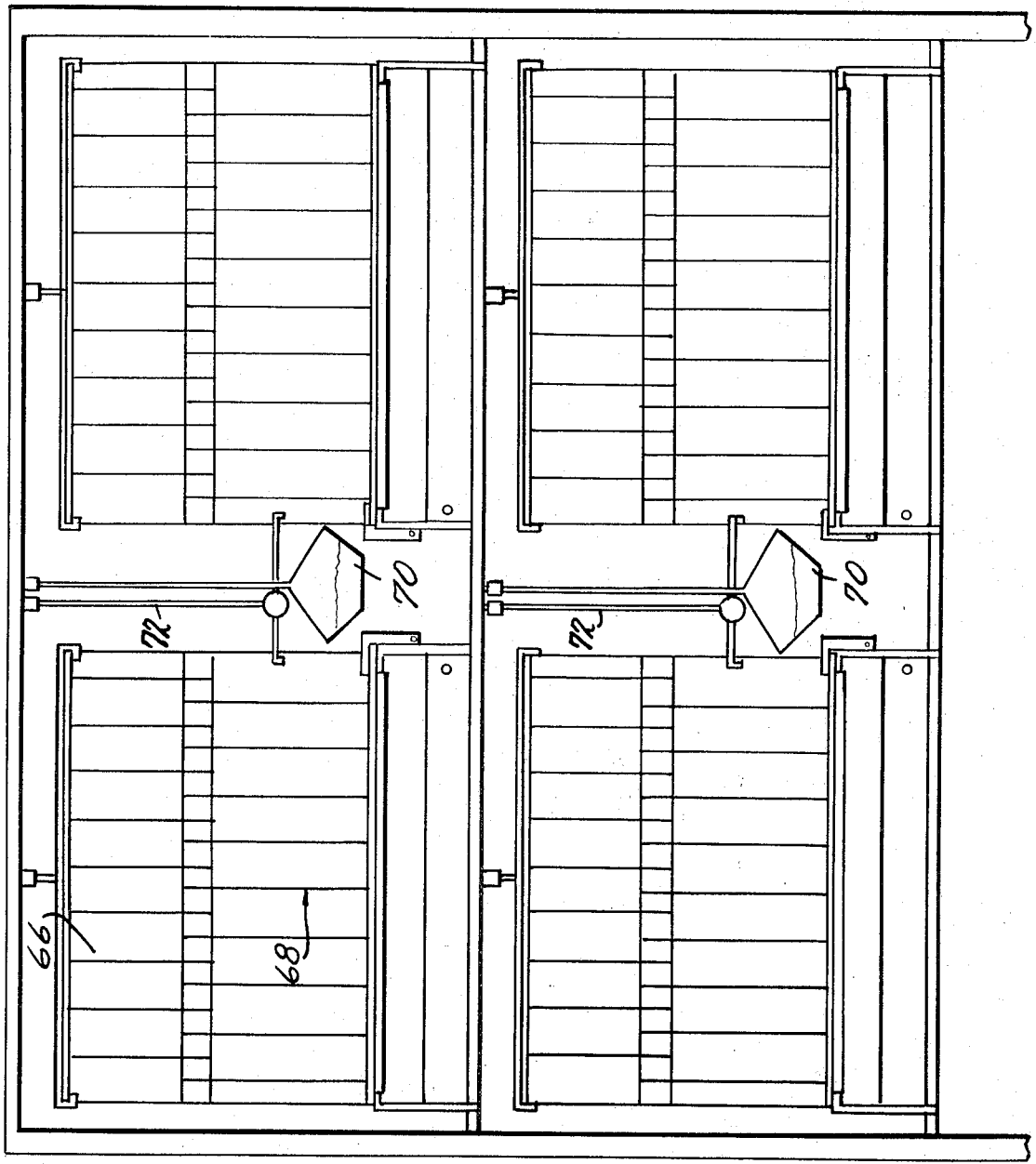
FIG. 4 shows a front view of a plurality of coops according to a further aspect of the invention.

Reference is now made to FIGS. 4, 5 and 6 which show another embodiment in an arrangement whereby a plurality of coops 64 are supported from the roof of a house in a stacked arrangement. As mentioned above, one of the difficulties previously encountered in raising fowl from small chicks to their full size in a single cage in arrangements which employ an exterior feeding trough to which the chicken have access by extending their heads between the vertical bars was that a spacing between vertical bars which was small enough to prevent small chicks from escaping from the coop was too small to permit larger birds from extending their heads between adjacent bars. To resolve this diffiulty, in the embodiment illustrated in FIGS. 4 - 6 coop 64 is comprised of two telescoping members 66 and 68 which are connected together and which both include a plurality of vertical bars with the bars being disposed alternatively as shown. Thus, when chicks are placed in one of the coops 64, the two members 66 and 68 are telescoped together to a collapsed position as shown in FIG. 7 so that the spacing between adjacent bars is insufficient for the chicks to escape, but is big enough for them to extend their heads between adjacent bars and feed from the conventional trough mechanism 70 which preferably includes a chain for moving the chicken feed along the trough Similarly, a conventional water supply 72 provides water to the chicks and later to the grown birds.

When the birds have grown sufficiently, the two members 66 and 68 are telescoped apart to the position illustrated in FIG. 4. In this position as can also be seen in FIGS. 5 and 6, the vertical bars, such as bars 74, 76, 78, 80 and 82, of portions 66 and 68 respectively are separated so that the spacing between adjacent bars such as bars 74, 78 and 82, through which the birds extend their heads to feed from trough 70, is great enough for the larger birds but not large enough for then to escape. Any suitable arrangement such as hooks, latches or the like can be employed as necessary for holding the telescoping members 66 and 68 in their collapsed position or extended position.

As shown alternate vertical bars such as bars 76 and 80 of portion 66 are attached to a horizontal bar 86 while the vertical bars of telescoping member 68 such as bars 74, 78 and 82 are attached to another similar horizontal bar 88. The vertical bars are attached to the sides of bars 86 and 88 so that the bars attached to horizontal bar 86 slide by bar 88 and similarly the bars attached to member 88 slide by bar 86. When the telescoping members have been telescoped to their full height as shown in FIG. 5, bars 86 and 88 come in to contact and prevent further telescoping.

Figure 7:
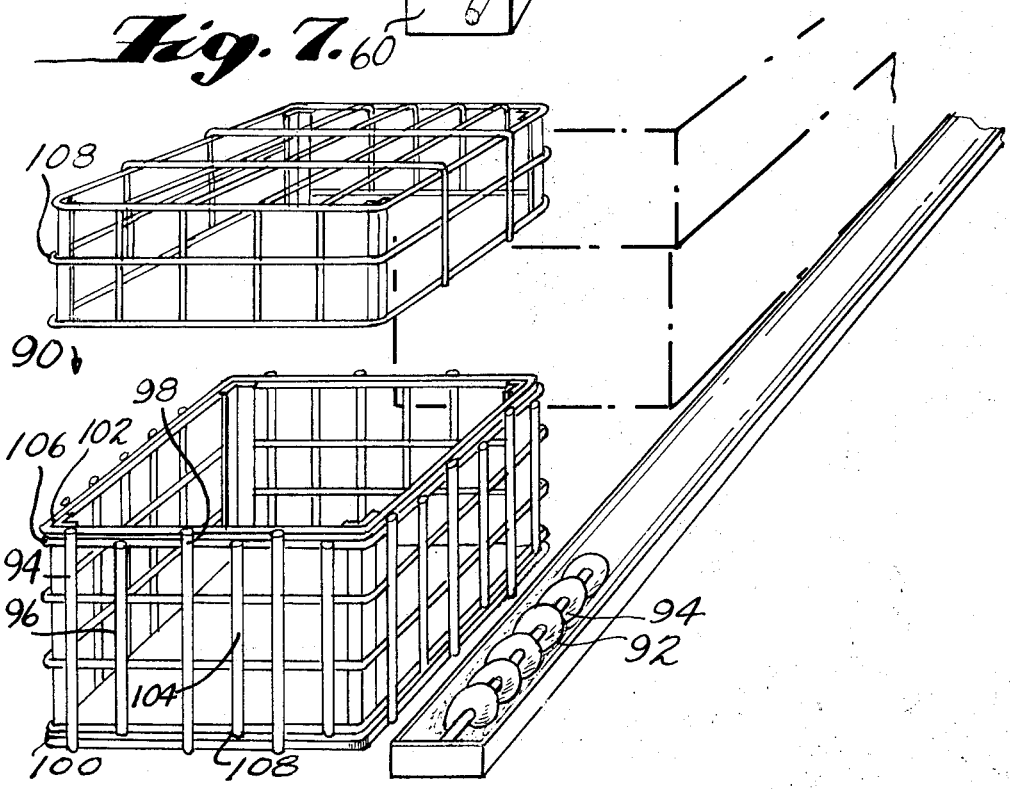
FIG. 7 shows a perspective view of a plurality of coops having removable tops and telescoping members arranged for feeding from an exterior trough.

FIG. 7 shows another arrangement whereby a plurality of coops 90 are disposed along a conventional trough 92 in which the chain 94 moves to distribute feed to birds who extend their heads between the vertical bars such as bars 94, 96 and 98 to reach the food in trough 94. As in the above arrangement of FIGS. 4-6, coop 90 includes two telescoping members, with cage 90 shown in its extended position. Bars 94 and 98, for example, are connected between horizontal bars 100 and 102, while bars 96 and 104 are connected between horizontal bars 106 and 108 so that the two telescoping members can be shifted from a first to a second position in the manner set forth above. Further, in the arrangement illustrated in FIG. 7, each coop 90 is provided with a top portion 108 in the same manner as set forth in FIG. 1, which covers the open top of the lower portion comprised of the two telescoping members and which adds height to the coop during grow-out.

Any arrangement can be employed for supporting the coop of this invention as set forth in the above embodiments. Since many older houses will not support a hanging system, a floor mounted system can be employed, although a hanging system may be advantageous. Whole house brooding is desired rather than individual gas brooders and possible methods include systems currently on the market such as plastic tubes, hot air system and space heaters of the type normally employed to heat large buildings and fired by oil or gas. The environmental control for summer cooling would make use of fans which could be used in conjunction with cooling pads from complete control.

Any suitable arrangement can be employed for manure control and in a full tiered system of two or more stacks of cases, this could be in the form of dropping boards where the manure from the coops above falls onto boards from which it is scraped manually or mechanically. Preferably a system for doing this would include a conveyor which would be of the endless belt type to move manure to one end of the house where it could be disposed of. In a stair-step type system, manure could fall to the floor into pits for disposal. Another possibility is plastic bag type containers under coops for holding manure. These bags would hold the manure from one or more batches of broilers and would be removed for disposal when full.

As part of the support system, the racks holding the coops could be constructed so that they could either be mechanically conveyed or roller or chain-type conveyors or pulled by cables in sections to the load out area. Alternatively, of course, coops could be manually removed from the rack and conveyed down the aisles on monorail systems or wheel dollies, or by any other means.

Any suitable mechanical arrangement for stacking the lower portions can be employed. A stacker as is used in dairies for stacking cases of milk would be quite adequate for this purpose, and these stackers work by lifting one case up above the conveyor where it is held in place until another case enters the system at which time it is lifted up into contact with the coop currently held at which time the two coops are held in place above the conveyor. This process continues until the desired number of coops are stacked at which time the stack of five or six or any number is lowered for movement on the conveyor.

Another possibility is for the coops to enter a platform controlled by an air or hydraulic cylinder and stacked one on top of the other as they enter the platform. A full stack would then be raised to platform height and moved on to the conveyor of the truck. Alternatively, of course, manual stacking may be employed. The problem of protruding chicken heads over the edge of the open top of the coops may require a cover extending to the stacking area. The top coop will normally require an additional cover which may be another plastic bottom or a higher covering as will have to extend over the top of the truck.

The transfer truck can be basically a standard bed or trailer type flat-bed truck, but would probably require a top to prevent escape of birds from the top layer of coop if a separate coop top is not provided and preferably has side rails extending at least partially up the sides. At the processing plant, the handling of topless coops is advantageous since no coop door need to be opened to reach in and grab for chicken legs and access to the chickens is considerably simpler than with coops currently employed.

Normally the coops will need to be sterilized before being returned to the farm for re-use. Preferably at the time that the loaded coops are taken to market, a load of empty coops will be unloaded from the truck at the farm and left for refill, with the full coops being hauled to the processors, emptied, cleaned and returned to the next grower.

It should be apparent that many changes and modifications in the above embodiment of the invention can be made without departing from the scope of the invention. Accordingly, that scope is intended to be limited only by the scope of the appended claims.

What is claimed is:

1. A coop for fowl comprising first and second telescoping members each including a plurality of roughly vertical bars with the members being connected together so as to be movable with respect to each other vertically and so that bars of one member are disposed alternately with bars of the other member so that the telescoping members can be moved with respect to each other from a first position in which adjacent bars have a first separation and the inner region has a first volume to a second position in which adjacent bars in at least a portion of the coop have a greater separation and the said inner region has a greater volume.

2. A coop as in claim 1 further including a floor member connected to one of said members.

3. A coop as in claim 2 wherein said floor member is formed from plastic and has a plurality of aperatures through it.

4. A coop as in claim 2 wherein said floor member has extensions on its underlying side for cooperating with the top of another one of said coops for stacking said coops.

5. A coop as in claim 2 wherein said first and second members form the sides of said coop and further including a further portion removably connected to the other of said telescoping members for closing the top of said coop.

6. A coop as in claim 6 wherein said further portion defines an inner region with sides and a top.

7. A coop as in claim 1 including a plurality of horizontal bars fixed to the vertical bars of said first telescoping member and a plurality of horizontal bars fixed to the vertical bars of said second telescoping member.

8. A method of raising fowl in a coop comprising first and second telescoping members each including a plurality of roughly vertical bars with the members being connected together so as to be movable with respect to each other vertically and so that bars of one member are disposed alternately with bars of the other member so that the telescoping members can be moved with respect to each other from a first position in which adjacent bars have a first separation and the inner region has a first volume to a second position in which adjacent bars in at least a portion of the coop have a greater separation and the said inner region has a greater volume, comprising the steps of:

keeping young fowl in said coop with said members in said first position so that the fowl can extend their heads between adjacent bars for feeding but cannot escape from said coop and moving said telescoping members to said second position when the fowl have grown large enough so that the larger fowl can extend their heads between adjacent bars but still cannot escape from said coop.

9. A method of raising fowl as in claim 8 wherein said coop has a further portion removably connected to one of said telescoping members for closing the top and said coop and further including the step of removing said further portion for transporting said.

10. A method as in claim 9 further including the step of stacking said coops with said further portions removed.

11. A system for raising and transporting fowl comprising a plurality of coops each having a first portion defining an inner region for the fowl with a floor, sides and an open top, said first portion defining a first inner volume, and including first and second telescoping members each including a plurality of roughly vertical bars with the members being connected together so as to be movable with respect to each other vertically and so that bars of one member are disposed alternately with bars of the other member so that the telescoping members can be moved with respect to each other from a first position in which adjacent bars have a first separation and the said inner region has a first volume to a second position in which adjacent bars in at least a portion of the coop have a greater separation and the said inner region has a greater volume, and a second portion connected to said first portion, closing said top and removable from said first portion for transporting said fowl said first and second portions defining an inner volume substantially greater than said inner volume when said first and second portions are connected together.

12. A system as in claim 11 including means for providing food and water to the fowl in said coops.

13. A system as in claim 11 wherein said floor is plastic and has a plurality of passages through it.

14. A system as in claim 13 wherein each said floor has on its underside structural members for cooperating with the top of another first portion for stacking said first portions.

15. A system as in claim 11 wherein each said second portion defines a further inner region with sides and a top so that removing a second portion from a first portion reduces the height of the coop comprised of that first and second portions.

16. A method of raising and transporting fowl comprising the steps of:

housing the fowl during growth in a coop comprised of a first portion defining an inner region of a first volume for the fowl with a floor, sides and an open top and including first and second telescoping members each including a plurality of roughly vertical bars with the members being connected together so as to be movable with respect to each other vertically and so that bars of one member are disposed alternately with bars of the other member so that the telescoping members can be moved with respect to each other from a first position in which adjacent bars have a first separation and the said inner region has a first volume to a second position in which adjacent bars in at least a portion of the coop have a greater separation and the said inner region has a greater volume, a second portion, connected to said first portion, closing said top and removable from said first portion said first and second portions defining a volume substantially greater than said first volume when said first and second portions are connected together, and transporting said fowl with said second portion removed.

17. A method as in claim 16 wherein said step of transporting includes the steps of removing second portions from a plurality of coops, and stacking the first portions of said coops one atop the other so that the open top of each first portions below other first portion is closed by the floor of the first portion immediately above it.

18. A method as in claim 17 wherein said step of transporting includes the further step of closing the open top of the first portion on the top of the stack.

19. A method as in claim 16 wherein said second portion defines a further inner region with sides and a top and including the step of removing the second portion so as to reduce the height of said coop.

20. A method as in claim 16 including the further step of providing feed exterior to said coop so as to be available to said fowl passage of the head between adjacent bars.

21. A method as in claim 16 including the step of providing food and water within said coop.

* * * * *